(12) United States Patent
Zitelli et al.

(10) Patent No.: US 10,328,634 B2
(45) Date of Patent: Jun. 25, 2019

(54) LIGHT ENGINES FOR PHOTO-CURING OF LIQUID POLYMERS TO FORM THREE-DIMENSIONAL OBJECTS

(71) Applicant: Nexa3D Inc., Ventura, CA (US)

(72) Inventors: Gianni Zitelli, Ciampino (IT); Avi N. Reichental, Carpinteria, CA (US); Luciano Tringali, Rome (IT)

(73) Assignee: Nexa3D Inc., Ventura, CA (US)

( * ) Notice: Subject to any disclaimer, the term of this patent is extended or adjusted under 35 U.S.C. 154(b) by 0 days.

(21) Appl. No.: 15/864,510

(22) Filed: Jan. 8, 2018

(65) Prior Publication Data
US 2018/0126646 A1 May 10, 2018

Related U.S. Application Data

(63) Continuation-in-part of application No. 15/415,688, filed on Jan. 25, 2017, which is a continuation-in-part
(Continued)

(30) Foreign Application Priority Data
Oct. 2, 2015 (IT) .................. 102015000057527

(51) Int. Cl.
*B29C 64/124* (2017.01)
*B33Y 10/00* (2015.01)
(Continued)

(52) U.S. Cl.
CPC .......... *B29C 64/124* (2017.08); *B29C 64/135* (2017.08); *B29C 64/223* (2017.08);
(Continued)

(58) Field of Classification Search
CPC ...................................... B29C 64/124
See application file for complete search history.

(56) References Cited

U.S. PATENT DOCUMENTS

| 4,575,330 A | 3/1986 | Hull |
| 5,122,441 A | 6/1992 | Lawton et al. |

(Continued)

FOREIGN PATENT DOCUMENTS

| EP | 171069 A2 | 2/1986 |
| EP | 484086 A1 | 5/1992 |

(Continued)

OTHER PUBLICATIONS

Henry, Dr. William, "MicroLED Arrays Find Applications in the Very Small", Photonics Spectra (Mar. 2013), downloaded from: https://www.photonics.com/a53224/MicroLED_Arrays_Find_Applications_in_the_Very, 7 pages.

(Continued)

*Primary Examiner* — Larry W Thrower
(74) *Attorney, Agent, or Firm* — Ascenda Law Group, PC

(57) ABSTRACT

Three-dimensional objects are formed by photo-curing a liquid polymer by exposure to a radiation, which radiation (e.g., at 410 nm) is provided by a collimated light source composed of an array of light emitting diode (LED) sources, an array of baffles, and an array of lenses. The baffles limit beam widths of each individual LED source in the array of LED sources, and the array of lenses is located one focal length from said array of LED sources.

14 Claims, 15 Drawing Sheets

Related U.S. Application Data of application No. PCT/IT2016/000225, filed on Oct. 3, 2016.

(60) Provisional application No. 62/450,470, filed on Jan. 25, 2017, provisional application No. 62/531,211, filed on Jul. 11, 2017, provisional application No. 62/531,276, filed on Jul. 11, 2017, provisional application No. 62/531,461, filed on Jul. 12, 2017.

(51) Int. Cl.

| | | |
|---|---|---|
| *B33Y 30/00* | (2015.01) |
| *B29C 64/135* | (2017.01) |
| *B29C 64/40* | (2017.01) |
| *B29C 64/277* | (2017.01) |
| *G02F 1/1335* | (2006.01) |
| *B29C 64/223* | (2017.01) |
| *B29C 64/255* | (2017.01) |
| *B29K 105/00* | (2006.01) |

(52) U.S. Cl.
CPC .......... *B29C 64/255* (2017.08); *B29C 64/277* (2017.08); *B29C 64/40* (2017.08); *B33Y 10/00* (2014.12); *B33Y 30/00* (2014.12); *G02F 1/133514* (2013.01); *G02F 1/133603* (2013.01); *G02F 1/133606* (2013.01); *G02F 1/133617* (2013.01); *B29K 2105/0058* (2013.01); *G02F 2001/133607* (2013.01)

(56) References Cited

U.S. PATENT DOCUMENTS

| | | | |
|---|---|---|---|
| 5,391,072 A | 2/1995 | Lawton et al. | |
| 5,476,749 A | 12/1995 | Steinmann et al. | |
| 8,663,539 B1 * | 3/2014 | Kolodziejska | B29C 64/129 264/401 |
| D734,788 S | 7/2015 | Reches et al. | |
| D777,251 S | 1/2017 | Stand | |
| 2009/0002669 A1 * | 1/2009 | Liu | G03F 7/7005 355/67 |
| 2015/0072293 A1 | 3/2015 | Desimone et al. | |
| 2015/0145171 A1 | 5/2015 | Walker et al. | |
| 2015/0352788 A1 | 12/2015 | Livingston et al. | |
| 2016/0046072 A1 | 2/2016 | Rolland et al. | |
| 2016/0046075 A1 | 2/2016 | Desimone et al. | |
| 2016/0046080 A1 | 2/2016 | Thomas et al. | |
| 2016/0052205 A1 | 2/2016 | Frantzdale | |
| 2016/0082655 A1 | 3/2016 | Castanon et al. | |
| 2016/0129645 A1 | 5/2016 | Wighton et al. | |
| 2016/0136890 A1 | 5/2016 | Castanon et al. | |
| 2016/0193786 A1 | 7/2016 | Moore et al. | |
| 2016/0200052 A1 | 7/2016 | Moore et al. | |
| 2016/0229123 A1 | 8/2016 | Carlson et al. | |
| 2016/0263837 A1 | 9/2016 | Goldman et al. | |
| 2016/0288376 A1 | 10/2016 | Sun et al. | |
| 2016/0303793 A1 | 10/2016 | Ermoshkin et al. | |
| 2016/0311158 A1 | 10/2016 | Desimone et al. | |
| 2016/0325493 A1 | 11/2016 | Desimone et al. | |
| 2016/0369096 A1 | 12/2016 | Rolland et al. | |
| 2017/0129167 A1 | 5/2017 | Castanon | |
| 2017/0129175 A1 | 5/2017 | Zitelli et al. | |
| 2018/0036941 A1 | 2/2018 | Xu et al. | |

FOREIGN PATENT DOCUMENTS

| | | |
|---|---|---|
| EP | 506616 A1 | 9/1992 |
| EP | 2226683 A1 | 9/2010 |
| ES | 2588485 T3 | 11/2016 |
| HK | 1215475 A1 | 8/2016 |
| WO | 2012021940 A1 | 2/2012 |
| WO | 2015107066 A1 | 7/2015 |
| WO | 2016010946 A1 | 1/2016 |
| WO | 2016081410 A1 | 5/2016 |
| WO | 2016109550 A1 | 7/2016 |
| WO | 2016123499 A1 | 8/2016 |
| WO | 2016123506 A1 | 8/2016 |
| WO | 2016126796 A2 | 8/2016 |
| WO | 2016133759 A1 | 8/2016 |
| WO | 2016140886 A1 | 9/2016 |
| WO | 2016140888 A1 | 9/2016 |
| WO | 2016140891 A1 | 9/2016 |
| WO | 2016145050 A1 | 9/2016 |
| WO | 2016145182 A1 | 9/2016 |
| WO | 2016149097 A1 | 9/2016 |
| WO | 2016149104 A1 | 9/2016 |
| WO | 2016149151 A1 | 9/2016 |
| WO | 2016126796 A3 | 10/2016 |
| WO | 2016172784 A1 | 11/2016 |
| WO | 2016172788 A1 | 11/2016 |
| WO | 2016172804 A1 | 11/2016 |
| WO | 2016172805 A1 | 11/2016 |
| WO | 2017056124 A1 | 4/2017 |

OTHER PUBLICATIONS

International Search Report and Written Opinion dated May 24, 2018, from ISA—European Patent Office, for International Application No. PCT/US2018/012774 (filed Jan. 8, 2018), 13 pages.

International Search Report and Written Opinion dated Feb. 6, 2017, from the European Patent Office, for International Patent Application No. PCT/IT2016/000225 (filed Oct. 3, 2016), 9 pgs.

International Search Report and Written Opinion dated May 4, 2018, from the ISA: European Patent Office, for International Patent Application No. PCT/US2018/015285 (filed Jan. 25, 2018), 13 pgs.

Vu; et al., "LED Uniform Illumination Using Double Linear Fresnel Lenses for Energy Saving", Energies (2017), 10 (2091):1-15.

* cited by examiner

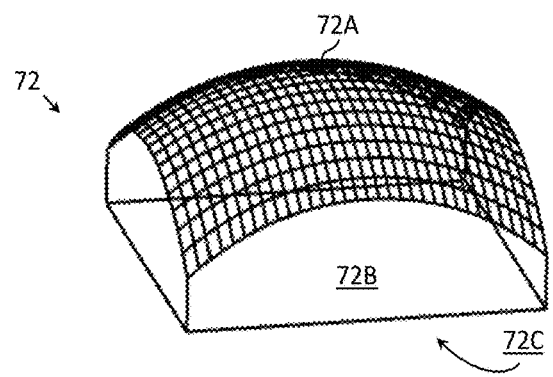
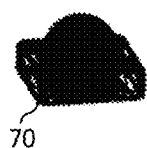
FIG. 10
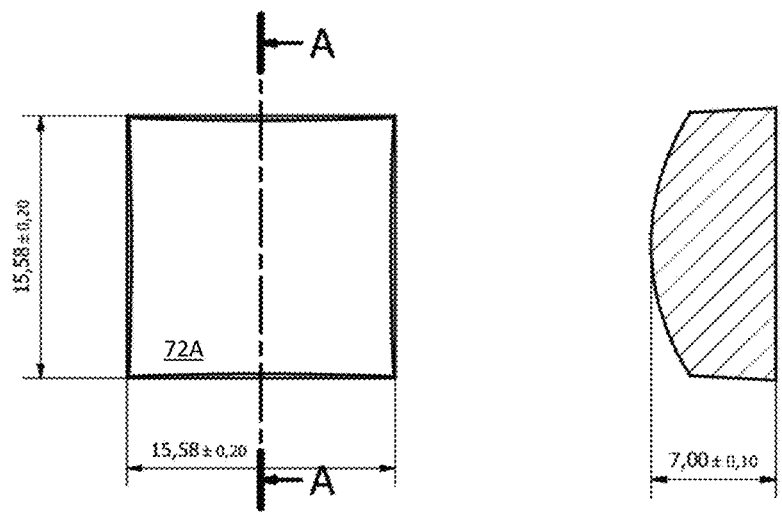
FIG. 11A  FIG. 11B

LIGHT ENGINES FOR PHOTO-CURING OF LIQUID POLYMERS TO FORM THREE-DIMENSIONAL OBJECTS

RELATED APPLICATIONS

This is a NONPROVISIONAL of, claims priority to, and incorporates by reference U.S. Provisional Application No. 62/450,470, filed Jan. 25, 2017, U.S. Provisional Application No. 62/531,211, filed Jul. 11, 2017, U.S. Provisional Application No. 62/531,276, filed Jul. 11, 2017, and U.S. Provisional Application No. 62/531,461, filed Jul. 12, 2017; and is a CONTINUATION-IN-PART of U.S. patent application Ser. No. 15/415,688, filed Jan. 25, 2017, which is a CONTINUATION-IN-PART of International Application No. PCT/IT2016/000225, filed Oct. 3, 2016, which claims priority to IT102015000057527, filed Oct. 2, 2015, each of which is incorporated herein by reference in its respective entirety.

FIELD OF THE INVENTION

The present invention relates to the field of three-dimensional printing, commonly referred to as 3D printing, and in particular to light engines for use in 3D printing apparatus that rely on photo-curing of liquid polymers for the formation of three-dimensional objects.

BACKGROUND

It is known that the field of 3D printing by photo-curing can comprise two basic technologies: stereolithographic printing, in which a laser emitting light at around 400 nm is used, to solidify by means of the beam emitted, a photo-curing liquid polymer which is contained in a special tank; and DLP (Digital Light Processing) printing, according to which a photo-curing liquid polymer, again in a tank, is exposed to luminous radiation emitted by a device similar to a projector. According to both these technologies, the printing process proceeds by making one layer of an object after another; that is, solidifying a first layer adhering to a supporting plate (or extraction plate), and then a second layer adhering to the first layer, and so on, until formation of the complete object. Therefore, according to these technologies, the data representing the three-dimensional object to be formed are organised as a series two-dimensional layers which represent transversal sections of the object under construction.

According to the bottom-up method, which may involve machines of either of the SLA and DLP types, the plate for extracting the object moves from the bottom of the tank upwards, as the object is formed layer-by-layer. The basic bottom-up method comprises:

a. a 3D model of the object to be constructed is represented in computer software as an ordered succession of layers, with thickness determined according to the technology adopted, the opacity of the liquid polymer, the quantity of catalyst used with the polymer, the degree of precision to be obtained, and the characteristics of the machine provided, usually said thicknesses being between 50 and 200 microns, but in any case, as a succession of a discrete and finite number of layers;

b. an extraction plate, consisting of a material which is able to facilitate the adhering on itself of the first layer of polymer, moves to a predetermined distance from the first layer and waits for the light beam (SLA or DLP) to solidify the first layer; it then raises by a distance sufficient for the layer just formed to detach from the base of the tank (usually approx. 1 mm) and then lowers by the same distance, less the predetermined distance for the formation of the second layer, and so on until the entire object is formed.

An improvement of the basic bottom-up method is described in the present Applicant's International Application No. PCT/IT2016/000225, filed Oct. 3, 2016, which claims priority to IT102015000057527, filed Oct. 2, 2015. In that patent application, a self-lubricating substratum (or membrane), which is transparent to the electromagnetic spectrum radiation used to cure the liquid polymer and which is present between the bottom of the tank in which the curing takes place and the layer of the object being formed, is described. The membrane gradually releases a layer of lubricating material which allows the liquid polymer suspended above the membrane to cure thereon, thus reducing suction effects and adherences between the object layer being formed and the tank base. The light source, for example a DLP projector, has an image focus plane at the interface of membrane with the liquid polymer. Photo-curing of the liquid polymer takes place at this interface, according to a projected image. Growth of the object under construction is thereby facilitated.

While such arrangements allow for acceptable printing speeds, they provide only limited x-y resolution (e.g., on the order of 75 microns) in the object under construction. Further, because of the need for significant light intensities to cure the liquid polymer, the DLP projector must be positioned close to the focal plane, limiting the area over which the liquid polymer curing can be effected (e.g., to on the order of 120×90 mm). This proximity of the DLP projector to the work space also introduces optical aberrations and distortions in the focal plane.

SUMMARY OF THE INVENTION

Embodiments of the present invention address deficiencies such as those noted above by replacing the DLP projector with a collimated light source and using an LCD display as an imaging platform. The light source provides a collimated luminous flow of radiation, which in one embodiment is within a wavelength region of 400-700 nm, and more particularly is at 410 nm, through an LCD panel to produce an image. The LCD panel includes a plurality of addressable pixels, which can be made individually transparent or opaque to the incident radiation. The effect of the incident radiation passing through the transparent ones of the crystals in the matrix forms an image on the display surface. The individual crystals of the matrix are made transparent or opaque by applying or not applying a voltage to a respective crystal, typically under the control of a processor or other controller that is provided a bit mapped (or other) version of the image for display.

The collimated light source is produced by an array of individual light emitters, in particular an array of light emitting diode (LED) sources configured to emit radiation at a wavelength between 400-700 nm, and in particular at 410 nm. The collimated light source may also include an array of baffles and an array of lenses, said baffles arranged so as to limit a beam width of each individual LED source in the array of LED sources to approximately a diameter of a lens of the array of lenses, and the array of lenses is located one focal length from said array of LED sources.

These and additional embodiments of the invention are described further below.

BRIEF DESCRIPTION OF THE DRAWINGS

The invention is now described, by way of example and without limiting the scope of the invention, with reference to the accompanying drawings which illustrate embodiments of it, in which:

FIG. 10 depicts components associated with one cell of a light source with a single layer of square lenses arranged in a square array, in accordance with one embodiment of the invention;

FIG. 11A depicts a top view of a square lens, in accordance with one embodiment of the invention;

FIG. 11B depicts a cross sectional view of the square lens along line A-A of FIG. 11A, in accordance with one embodiment of the invention;

DETAILED DESCRIPTION

In the present Applicant's International Application No. PCT/IT2016/000225, methods and apparatus for photo-curing a liquid polymer for the formation of three-dimensional objects while employing a self-lubricating substratum are described. These methods and apparatus propose to reduce or eliminate suction effects (resulting from a vacuum between the layer of the object being formed and the base of a tank positioned beneath it), reduce or eliminate adherences between the layer being formed and the tank base, reduce mechanical stresses introduced by the above-mentioned effects, and provide a process for forming three-dimensional objects in much shorter times as compared with conventional solutions. In particular, such methods and apparatus for photo-curing for the formation of three-dimensional objects involve interposing, between the base of the tank and the photo-curing liquid polymer, a membrane, which membrane is transparent to the electromagnetic spectrum of interest and is able to gradually release a layer of lubricating material which allows the polymer, suitably doped, to solidify while remaining suspended on the layer of lubricating material.

Figure 1:
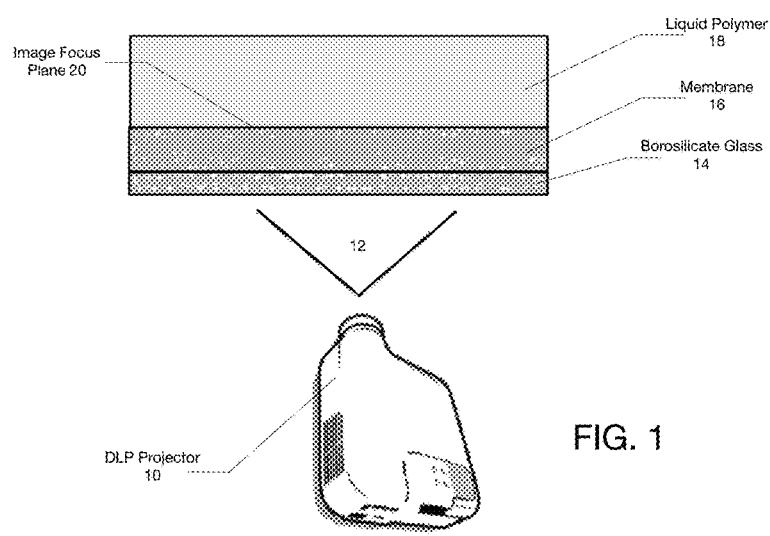
FIG. 1 shows an example of the use of a DLP projector in a photo-curing system employing a membrane.

An example of such an arrangement is shown in FIG. 1. A DLP projector 10 produces a luminous flow 12 through a layer of borosilicate glass 14 at the base of a tank (not shown). Above the borosilicate glass is a membrane 16. Membrane 16 is described in detail in International Application No. PCT/IT2016/000225, filed Oct. 3, 2016, which claims priority to IT102015000057527, filed Oct. 2, 2015, incorporated herein by reference. Briefly, membrane 16 is a self-lubricating substratum that is transparent to the electromagnetic spectrum radiation from DLP projector 10 and is able to gradually release a layer of lubricating material which allows the liquid polymer 18 suspended above the membrane to cure thereon, thus reducing suction effects and eliminating adherences between the object layer being formed and the tank base. DLP projector 10 has an image focus plane 20 at the interface of membrane 16 with the liquid polymer 18. Photo-curing of the liquid polymer takes place at this interface, according to the projected image, and growth of the object under construction is thereby facilitated. The liquid polymer may be suitably doped with ultraviolet catalysts (sensitive in the bandwidth of the luminous flow produced by the DLP projector) and lubricating substances. This arrangement allows for rapid object growth (with printing speeds on the order of 1.8 min/cm for layers of 200-micron thickness), but at limited x-y resolution (e.g., 75 microns). Further, because of the need for significant light intensities to cure the liquid polymer, the DLP projector must be positioned close to the work space, limiting the area over which the liquid polymer curing can be effected (e.g., on the order of 120×90 mm). This proximity of the DLP projector to the work space also introduces optical aberrations and distortions in the focal plane.

Embodiments of the present invention address these deficiencies by eliminating the use of a DLP projector and replacing it with a collimated light source that emits electromagnetic radiation at a wavelength of approximately 410 nm (or, more generally, within a wavelength region of 400-700 nm). The light source comprises, in one embodiment, an array of light emitting diodes (LEDs) whose outputs are constrained by individual beam directors (or baffles) and collimated by a lens array. The resulting collimated light beam is used to illuminate a liquid crystal display (LCD) located within the tank containing the liquid polymer, below the above-described membrane. The LCD is under computer control so as to render a representation of the image of the cross section of the object to be printed such that the collimated light beam passes through those portions of the LCD not rendered opaque to the wavelength of the incident radiation and effects photo-curing of the liquid polymer in the work space of the apparatus immediately above the LCD. This arrangement affords high resolution in the x-y plane (e.g., on the order of approximately 50 microns or less, and in one embodiment approximately 30 microns), free from optical aberrations or distortions, while preserving rapid printing speeds (e.g., printing thicknesses on the order of 200 microns in approximately 2-2.5 sec).

Figure 2:
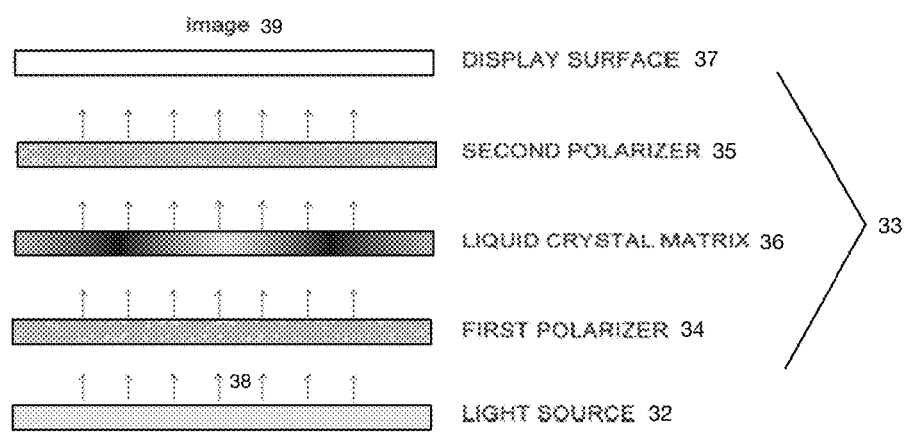
FIG. 2 shows a schematic view of the operation of a system for forming objects by photo-curing using a collimated light source and a liquid crystal display, in accordance with an embodiment of the present invention.

FIG. 2 shows one example of this arrangement. A light source 32 provides a collimated luminous flow of radiation 38, which in one embodiment is within a wavelength region of 400-700 nm, and more particularly is at 410 nm, through LCD panel 33 to produce an image 39. The LCD panel includes two polarizing layers 34, 35, sandwiching a liquid crystal matrix 36. The liquid crystal matrix includes a plurality of addressable pixels, which can be made individually transparent or opaque to the incident radiation. The effect of the incident radiation passing through the transparent ones of the crystals in the matrix forms the image 39 on the display surface 37. The individual crystals of the matrix 36 are made transparent or opaque by applying or not applying a voltage to a respective crystal, typically under the control of a processor or other controller that is provided a bit mapped (or other) version of the image for display. In one embodiment, the LCD display 33 may have a resolution of 840 dpi.

The wavelength of light for the collimated light source is selected on the edge of the visible range of light because the polarizers of the LCD display typically act as UV filters. Many photo-curable polymers (also known as resins) of the type used for 3D printing cure in the UV band. Using LCD imaging devices therefore presents a problem in conventional systems because the UV radiation would be filtered out by the polarizers of an LCD display. At the same time, resins which cure in the visible band typically cannot be used to achieve x-y resolutions in the image plane of approximately 50 microns or less. Instead, these systems typically achieve resolutions on the order of 100 microns. Accordingly, resins used in embodiments of the present invention are curable at centre wavelengths of approximately 370 nm, but still provide good curing characteristics at 410 nm, the preferred wavelength of the collimated light source.

Figure 3A:
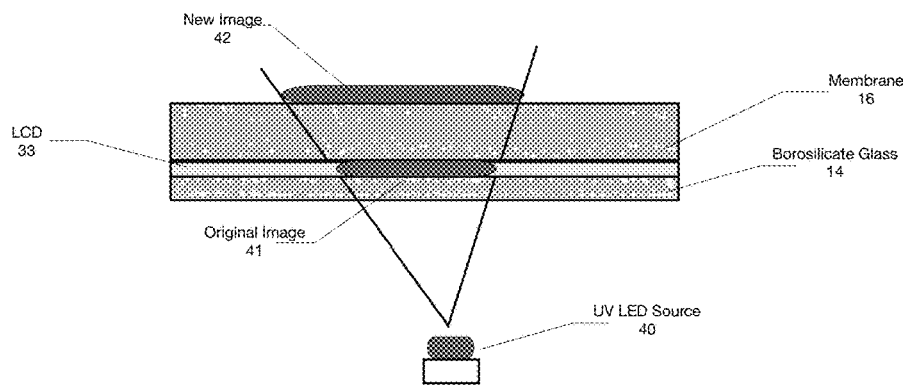
FIG. 3A shows an example of image distortions experienced using a point light source.

As noted, the preferred light source is a collimated light source and it is preferably produced by an array of individual light emitters. This is because point sources tend not to produce sufficient energy to effect curing of the resin (at least not over a sufficiently large area), and further, cause distortions due to zoom effects, as illustrated in FIG. 3A. When a point source, such as a single UV LED 40, is used to illuminate an LCD display 33 in a photo-curing arrangement (for simplicity only the borosilicate glass 14 and membrane 16 of the arrangement are illustrated), an original image 41 becomes enlarged 42 at the image plane on the top surface of membrane 16. This is unsatisfactory because the enlarged image will tend to be irregular at its edges and of the wrong size. Further, the light energy at the image plane is non-uniform over its area, therefore curing times would vary between the center of the image and its edges.

Figure 3B:
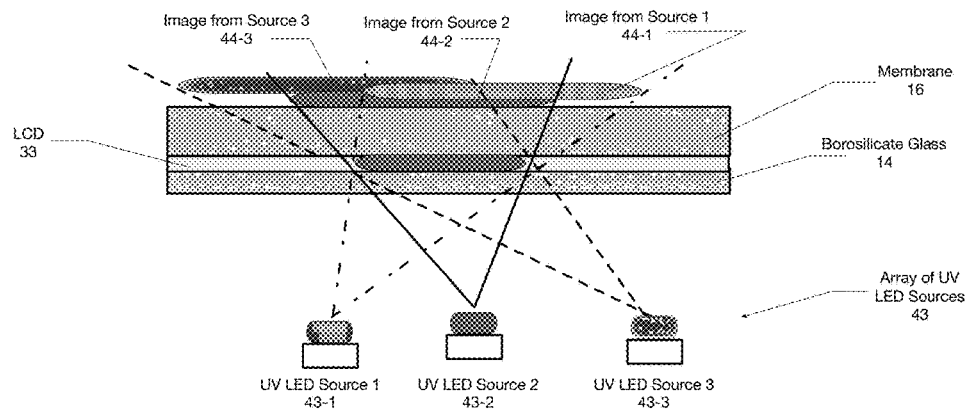
FIG. 3B shows an example of shadow effects created when using an array of point light sources.
Figure 4:
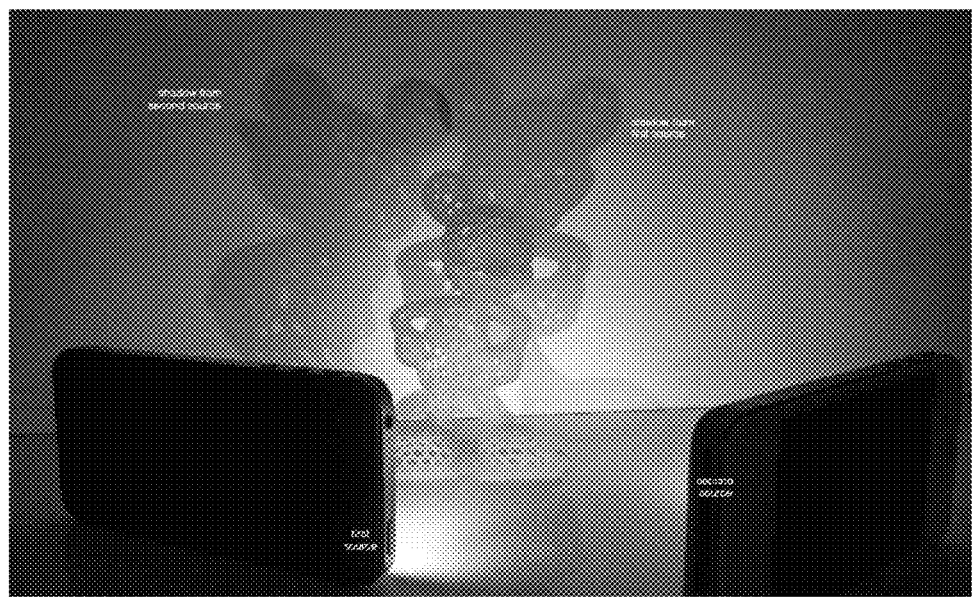
FIG. 4 shows a photographic image illustrating shadow effects created when using an array of point light sources.

Using an array of light sources is not, however, without its own challenges. The array of sources is needed to achieve sufficient energy to affect the photo-curing of the resin and to make more uniform the distribution of light energy over the image area, but, as shown in FIG. 3B, causes shadowing as each individual source in the array will produce its own image (enlarged) in the image plane. An array 43 of individual LED sources 43-1, 43-2, 43-3, illuminates the LED display 33, which is disposed between the borosilicate glass 14 and the membrane 16. Each of these sources thus produces its own respective representation 44-1, 44-2, 44-3, of the image on the LCD display 33 at the image plane at the interface between the membrane 16 and the photo-curing resin (not shown). These images are each enlarged and overlap one another, resulting in shadowing and other undesirable image effects. An example of a shadow effect for two light sources incident on a single object (such as the LCD image) is illustrated in FIG. 4.

Figure 5:
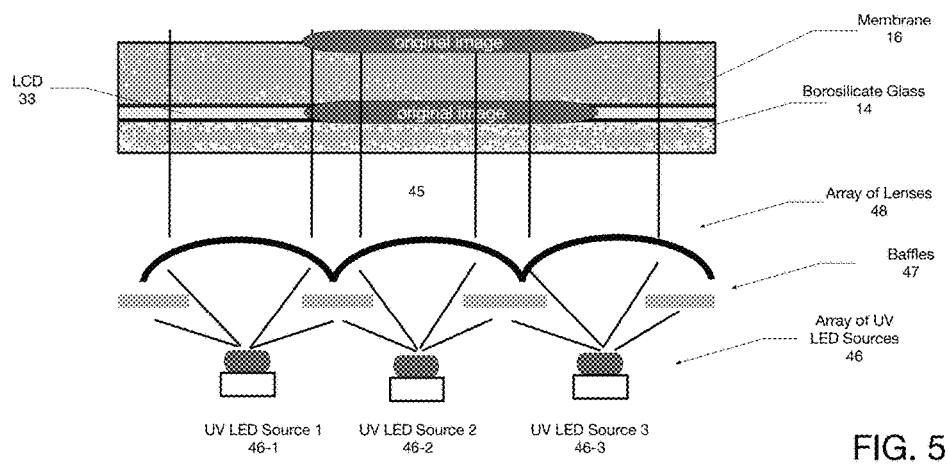
FIG. 5 shows a schematic view of the operation of a system for forming objects by photo-curing using a collimated light source made up of individual LED sources and a liquid crystal display, in accordance with an embodiment of the present invention.
Figure 6:
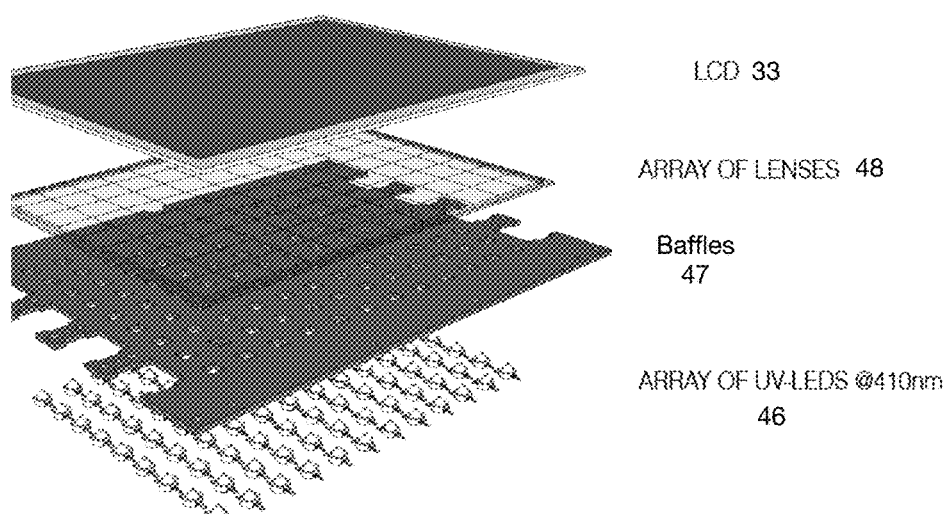
FIG. 6 shows an exploded view of the collimated light source made up of individual LED sources and the liquid crystal display, in accordance with an embodiment of the present invention.

Using a collimated light source eliminates these shadow effects, as shown in FIG. 5. A collimated luminous flow 45 is produced by an array 46 of individual LEDs, 46-1, 46-2, 46-3, using baffles 47 and an array of collimating lenses 48. The baffles 47 are arranged so as to limit the beam width of each individual LED source 46-1, 46-2, 46-3, to approximately the diameter of the lenses used in array 48. The array of lenses is placed one focal length away from each LED source, which may also be placed one focal length apart from one another, hence, the baffles are sized to accommodate such spacing. In one embodiment of the invention, a 9×12 array of LED sources is used. This is illustrated in FIG. 6, which shows in exploded view the array of LEDs 46, the baffles 47, each one corresponding to one of the LEDs, the array of lenses 48, one lens per LED, and the LCD display 33 via which the image to be printed is introduced. Referring back to FIG. 5, the collimated light produced by the array of lenses 48 ensure that the image from LCD 33 retains its original size when projected on the top interface of membrane 16, just below the bottom surface of the photo-curing liquid polymer (not shown). The LCD is under computer control so as to render a representation of the image of the cross section of the object to be printed such that the collimated light beam passes through those portions of the LCD not rendered opaque in the wavelength of the incident radiation and effects photo-curing of the liquid polymer in the work space of the apparatus immediately above the LCD. This arrangement affords high resolution in the x-y plane (e.g., on the order of approximately 50 microns or less, and in one embodiment approximately 30 microns), free from optical aberrations or distortions, while preserving rapid printing speeds.

In various embodiments of the invention, the beam widths of the LED sources are constrained to approximately 90% or more of their full angular displacement from center. In some embodiments, this corresponds to a distance between baffled LEDs of one focal length of the lenses used in the array of lenses. In one embodiment of the invention, the collimated light source produces a luminous flux of 250 mW/cm² at approximately 410 nm, allows for printing of a 200-micron thick layer within approximately 2-2.5 seconds, with an x-y resolution of approximately 30 microns, without distortions, using an LCD display of 840 dpi. The individual LED sources of the array are spaced away from the lenses at the focal length of the lenses of the lens array; hence the baffles are each one focal length square.

Figure 7:
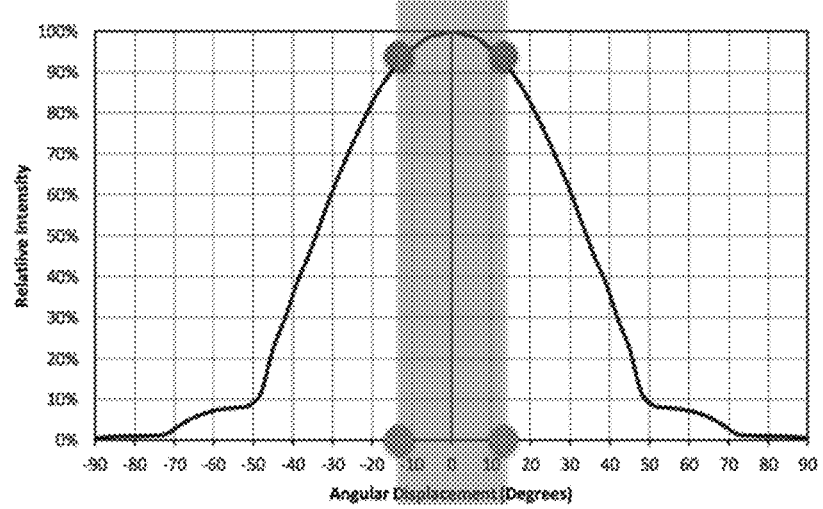
FIG. 7 illustrates an example of a spatial radiation pattern for a collimated light source configured in accordance with an embodiment of the present invention.

As shown in FIG. 7, in one embodiment the collimated light source is configured to constrain light emitted from each source LED in a spatial radiation pattern no wider than approximately 20 degrees, i.e., within about 10 degrees radially from its central axis, or more specifically within approximately 15 degrees, i.e., within about 7.5 degrees radially from its central axis, so as to ensure a sufficient and reasonably consistent luminous flux over the entire working area where the polymer is undergoing curing.

Further embodiments of the present invention provide for the formation of three-dimensional objects by photo-curing a liquid polymer by exposure to a radiation, which radiation is provided by a collimated light source composed of an array of multifrequency LED sources, an array of baffles, and an array of lenses. The baffles limit beam widths of each individual LED source in the array of LED, and the array of lenses is located one focal length from said array of LED sources. The collimated light source further includes a liquid crystal display having a plurality of filters, each filter of the plurality of filters corresponding to a wavelength of emitted radiation from the LED sources.

Figure 8:
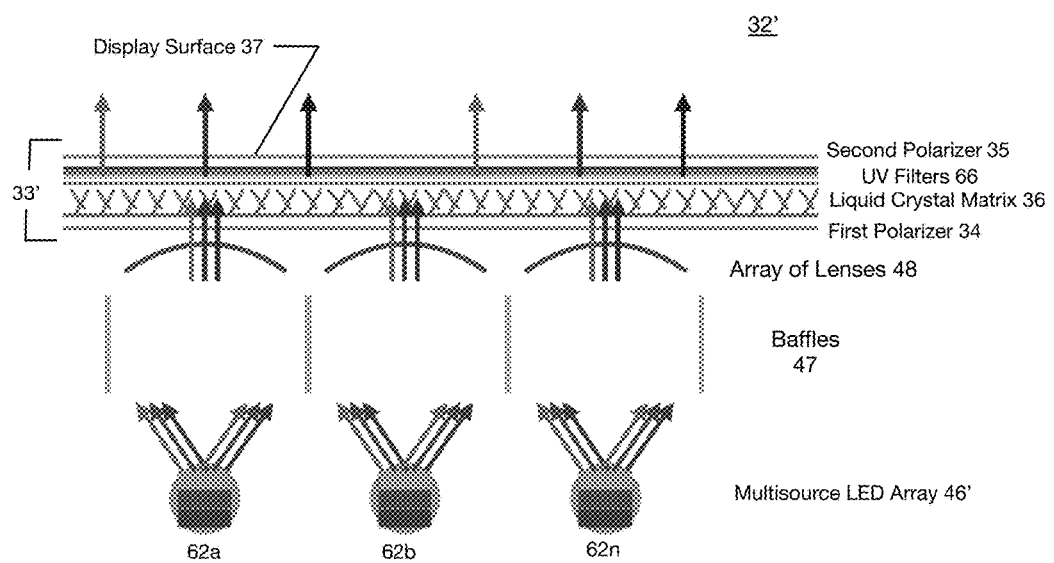
FIG. 8 shows a schematic view of the operation of an embodiment of a collimated multifrequency light source of the present invention.

FIG. 8 shows an example of a light source 32', which provides a collimated luminous flow of radiation through an LCD panel 33' to produce an image at a display surface 37. The LCD panel 33' includes two polarizing layers 34, 35, sandwiching a liquid crystal matrix 36. The liquid crystal matrix includes a plurality of addressable pixels, which can be made individually transparent or opaque to the incident radiation. The effect of the incident radiation passing through the transparent ones of the crystals in the matrix forms the image on the display surface 37. The individual crystals of the LCD matrix 36 are made transparent or opaque by applying or not applying a voltage to a respective crystal, typically under the control of a processor or other controller that is provided a bit mapped (or other) version of the image for display. In this example, the polarizing layers 34, 35 are transparent to ultra-violet (UV) radiation from the LEDs 62a-62n, which make up a multisource LED array 46'.

Additionally, included in the LCD panel 33' is a set of two or more UV filters 66. UV filters 66 are designed to have narrow bandwidths so that each filters out a narrow frequency range of incident radiation from the LEDs of the multisource LED array 46'. The UV filters 66 may be positioned between the liquid crystal matrix 36 and the upper polarizing film 35, as shown in this example, or elsewhere within the LCD panel. Preferably, the LEDs 62a-62n which make up the multisource LED array 46' each emit light in two or more narrow bandwidths and the UV filters 66 are matched to those bandwidths such that for each wavelength of emitted light of the LEDs there is a corresponding UV filter present.

As indicated, the liquid crystal matrix 36 includes a plurality of addressable pixels, which can be made individually transparent or opaque to the incident radiation. In one embodiment, an active (e.g., TFT) LCD panel is used, but in other instances a passive (e.g., STN) LCD panel may be used. Each segment of the liquid crystal matrix acts as a gate to incident light from the LEDs 62a-62n. Together with the UV filters 66, the LCD panel passes or blocks, on a per-pixel basis, specific wavelengths of incident UV radiation. For example, if the LEDs 62a-62n are each capable of emitting light at wavelengths $UV_a$, $UV_b$, and $UV_c$, then by controlling the segments of the liquid crystal matrix to be transparent or not, each "pixel" of the image at the display surface can be controlled to be one of wavelength $UV_a$, $UV_b$, or $UV_c$, or a combination of two or more thereof. This is similar to the manner in which a red-green-blue LCD display provides color images. Examples of LEDs that emit light at multiple, discrete UV wavelengths are the LZ4 series of LEDs, available from LED Engin, Inc., of San Jose, Calif.

Baffles 47 constrain the beam widths of the individual LED sources 62a-62n to a fraction of their full angular displacement from center. In some embodiments, the baffles are centered one focal length of the lenses used in the array of lenses 48 from one another. Further, the individual LED sources 62a-62n of the array are spaced away from the lenses at the focal length of the lenses of the lens array 48; hence the baffles 47 are each one focal length square.

The light engine 32' provides a collimated luminous flow of radiation, at one or more wavelengths, through LCD panel 33' to produce an image at the display surface. The various wavelengths of light for the LED sources may be selected so as to permit the use of different additives in a polymer resin from which the three-dimensional article under fabrication will be formed. Many photo-curable polymers of the type used for 3D printing cure in the UV band. By introducing curing agents that are sensitive at different wavelengths, different structural characteristics of the object under fabrication can be achieved by filtering the incident radiation appropriately.

For example, some curing agents may be sensitive at a wavelength $UV_a$, while others are sensitive at a wavelength $UV_b$. By maintaining suitably selective UV filters 66, and selectively passing or not passing light at wavelengths $UV_a$ and $UV_b$ through pixels of LCD panel 33' in the manner described above, the different curing agents can be activated on a near per-pixel basis (inasmuch as the curing will occur almost immediately adjacent the top surface of the LCD panel and therefore beam divergence can be expected to be a minimum) at the interface of the membrane (not shown in FIG. 8) with the polymer resin. Consequently, some areas of the object may be more rigid than others, if for example, the different curing agents have different curing times for a given polymer resin.

As noted, the preferred light source is a collimated light source and it is preferably produced by an array of individual light emitters. This is because, as explained above, and in Applicant's U.S. patent application Ser. No. 15/415,688, point sources tend not to produce sufficient energy to effect curing of the resin (at least not over a sufficiently large area), and may cause distortions due to zoom effects. Further, the use of baffles 47 helps to eliminate shadowing in the image plane. The baffles are arranged so as to limit the beam width of each individual LED source to approximately the diameter of the lenses used in array 48.

In still further embodiments of the invention, instead of light sources and filters in the UV region of the spectrum, light sources that emit light in the visible band, and corresponding filter films, may be used. For example, LED sources that emit distinct red, green, and blue light may be used as LEDs 62a-62n, and corresponding red, green, and blue filters 66 would be used therewith. Red-green-blue LCD panels are readily available, hence, such embodiments may be less expensive to produce, provided appropriate curing agents can be used with the liquid polymer.

In still further embodiments, LEDs that emit light across broad spectrums of visible and UV wavelengths, or that emit light at multiple, discrete wavelengths in each band, may be used. In such examples, the color of a fabricated object at various pixels may be controlled by passing light of an appropriate wavelength through the LCD panel so as to activate a color agent (pigment) within the resin at points of which it is being cured.

In still further embodiments, the LED sources may include multiple LEDs. That is, one or more of LED source 62a-62n may include multiple light sources (e.g., multiple LED emitters), each of a different wavelength of UV, and/or red, green, and blue light. That is, one or more cells of the array of LEDs may include multiple LEDs, each active at a different wavelength or wavelengths, the cell thereby being capable of producing light across a wide spectrum. In such examples, the color and/or composition of a fabricated object at various pixels may be controlled by passing light of an appropriate wavelength through the LCD panel so as to activate a color or material agent (pigment) within the resin at points of which it is being cured. Thus, the apparatus for forming three-dimensional objects by photo-curing a photo-curing liquid polymer by exposure to a radiation, may include a collimated light source to emit said radiation by which said photo-curing liquid polymer undergoes curing, wherein said collimated light source comprises a plurality of LED sources, each of said LED sources configured to emit radiation at a plurality of wavelengths. One or more of these LED sources may include a plurality of LED emitters, each of said emitters configured to emit radiation at one or more wavelengths.

Figure 9:
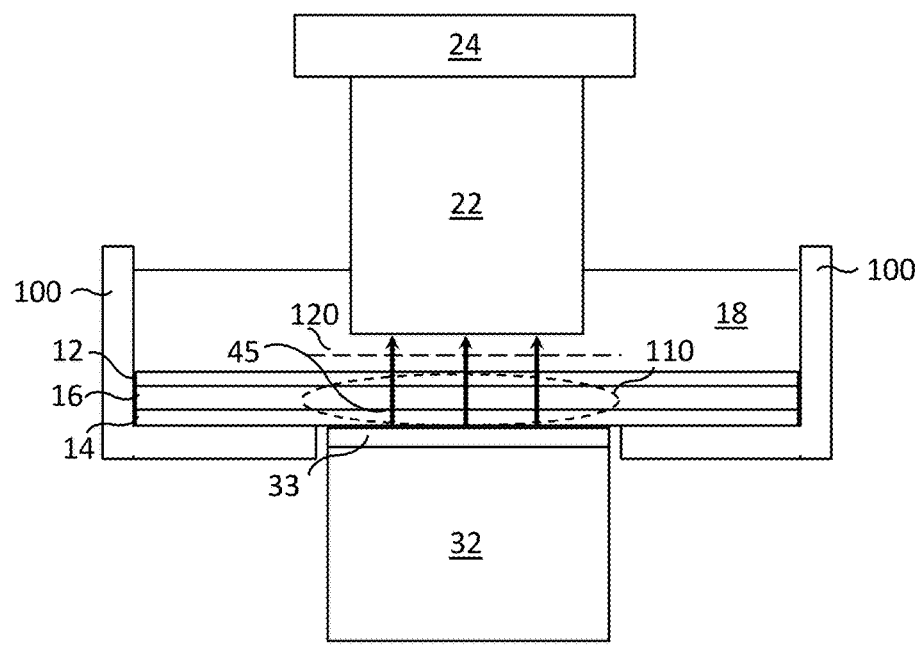
FIG. 9 depicts a 3D printing system, in which electromagnetic radiation is used to cure a photo-curing liquid polymer, in accordance with some embodiments of the invention.

FIG. 9 depicts a 3D printing system, in which electromagnetic radiation is used to cure a photo-curing liquid polymer, in accordance with some embodiments of the invention. Tank 100 contains photo-curing liquid polymer 18, which cures (i.e., hardens) upon being exposed to electromagnetic radiation at certain frequencies (e.g., UV light). The bottom of tank 100 may include tank window 110. In one embodiment, tank window 110 is formed by a flexible membrane 16 backed by a rigid backing member 14 (e.g., borosilicate glass), both of which are transparent to the certain frequencies of electromagnetic radiation at which curing of the photo-curing liquid polymer occurs.

Light source 32 projects electromagnetic radiation 45 (or rays thereof) through LCD 33 onto focal plane 120 situated within photo-curing liquid polymer 18. LCD 33 selectively filters electromagnetic radiation 45, allowing an image of the cross-section of the object to be formed on focal plane 120. Light source 32, as discussed above, projects a column of electromagnetic radiation with rays that are collimated and have a uniform intensity.

As a result of an interaction between electromagnetic radiation 45 and photo-curing agents present in photo-curing liquid polymer 18, a cured layer forms between the bottom of a partially formed 3D object 22 and the bottom of tank 100. The cured layer adheres to the bottom of object 22, forming a cross section of the object, but substantially does not adhere to the bottom of tank 100 due to the non-stick properties of membrane 16 and a lubricant layer 12 disposed on the surface of membrane 16. After the cured layer has been formed, object 22 may be raised relative to tank 100. A height adjusting means (not depicted) may be used to raise extraction plate 24, which in turn raises object 22 (now with the newly formed layer included). Photo-curing liquid polymer 18 then flows into the gap (i.e., created by the raising of object 22) between the bottom surface of object 22 and membrane 16, and the process may be repeated (i.e., project image, raise object, project image, raise object) to form additional cured layers until object 22 is fully formed.

As discussed above, embodiments of the present invention provide a collimated light source, in part through the use of an array of lenses. In some embodiments, square-shaped lenses are arranged in an array. In other embodiments, two layers of square-shaped lenses are used. In still further embodiments, hexagonal-shaped lenses arranged in a honeycomb pattern are employed. Each of these arrangements is discussed below.

FIG. 10 depicts components associated with one cell of light source 32. The components may include LED 70 and square-shaped lens 72. In one embodiment, lens 72 may be a plano-convex glass lens, including convex top surface 72A, planar bottom surface 72C and four planar side surfaces 72B (only one of which has been labeled). Square-shaped lens 72 is configured to collimate the electromagnetic radiation which propagates from LED 70. As described above, light source 32 may comprise an array of cells, each including an LED 70 and respective lens 72. FIG. 11A depicts a top view of square-shaped lens 72. The length and width of lens 72 may both measure 15.58 mm+/−0.20 mm. FIG. 11B depicts a cross sectional view of the lens along line A-A of FIG. 11A. The height of lens 72 may measure 7.00 mm+/−0.10 mm.

Figure 12:
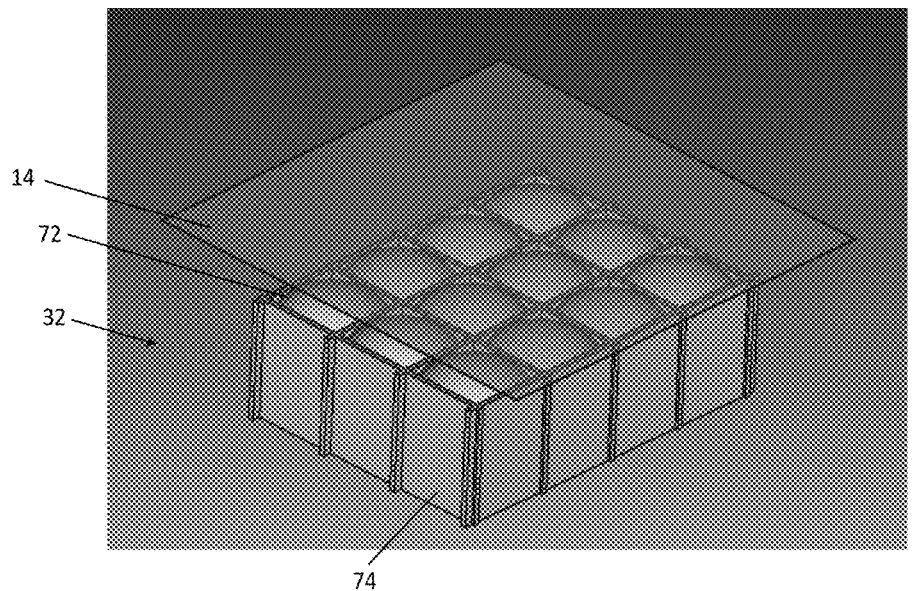
FIG. 12 depicts a perspective view of the light source with a single layer of square-shaped lenses arranged in an array, in accordance with one embodiment of the invention.
Figure 13:
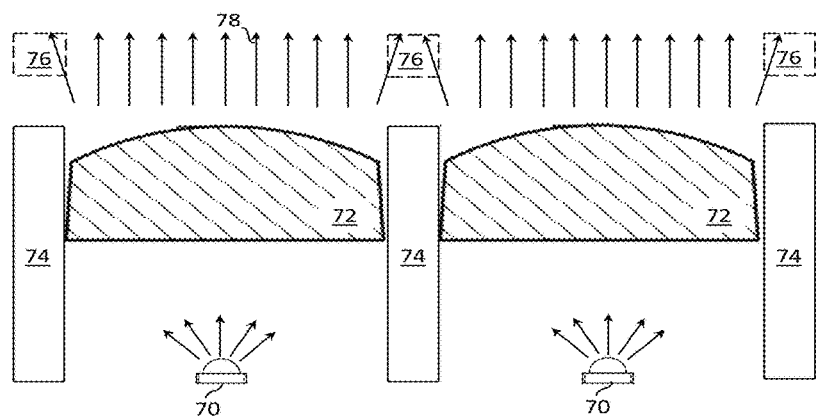
FIG. 13 depicts a cross-sectional view of the light source of FIG. 12, showing a mixing of radiation between adjacent cells, in accordance with one embodiment of the invention.

As discussed above, the individual cells of light source 32 may be separated from one another by baffles. In some instances, as shown in FIG. 12, the baffles may comprise opaque partition walls 74. Opaque partition walls prevent electromagnetic radiation from one cell from entering an adjacent cell (at least prior to the electromagnetic radiation exiting from lenses 72). Electromagnetic radiation which reaches lenses 72 is substantially collimated, except for radiation exiting near the edges of the lenses. As depicted in FIG. 13, electromagnetic radiation 78 near partition walls 74 is directed, by lenses 72, toward an adjacent cell to illuminate "dead zone" 76 created by the shadows of partition walls 74.

Figure 14:
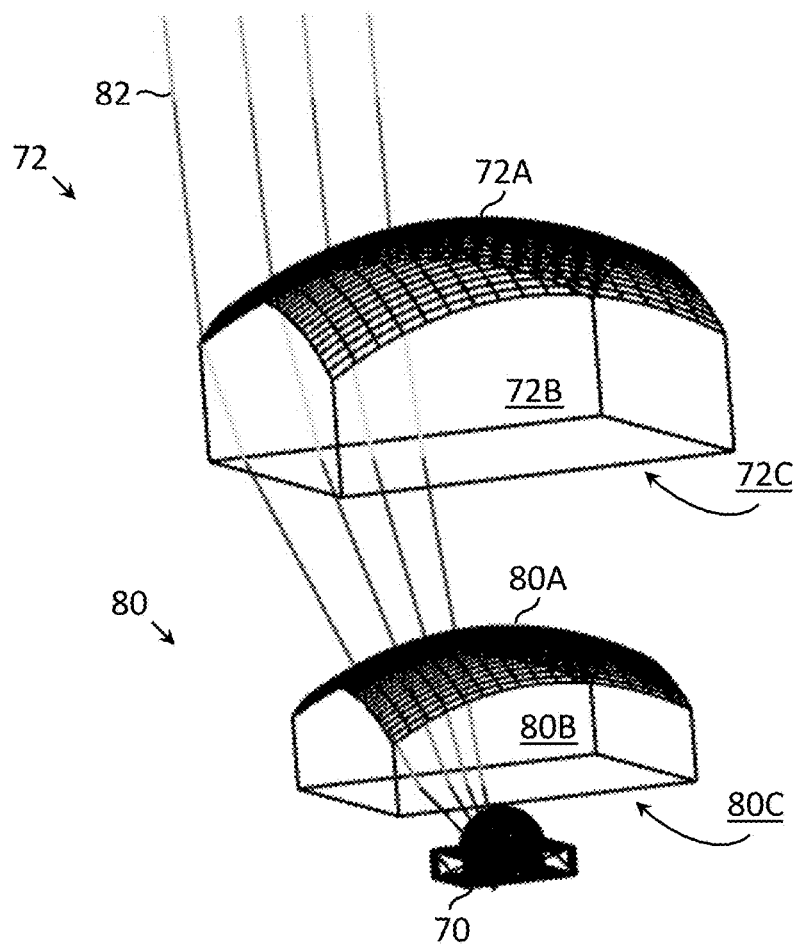
FIG. 14 depicts a perspective view of one cell of a light source with two layers of square-shaped lenses arranged in an array, in accordance with one embodiment of the invention.

In some embodiments of the invention, to increase the total power delivered to the focal plane (while keeping the number of LEDs unchanged and keeping the power at which the LEDs are operated unchanged) two square-shaped lenses per cell of the light engine may be utilized, as depicted in FIG. 14. Square-shaped lens 80 helps direct radiation 82 that otherwise would have been absorbed by partition walls 74 through square-shaped lens 72, thereby increasing the total power. As described above, square-shaped lens 72 may be a plano-convex glass (or plastic) lens, including convex top surface 72A, planar bottom surface 72C and four planar side surfaces 72B (only one of which has been labeled). Similarly, square-shaped lens 80 may be a plano-convex glass (or plastic) lens, including convex top surface 80A, planar bottom surface 80C and four planar side surfaces 80B (only one of which has been labeled). Square-shaped lens 80 may have smaller dimensions than square-shaped lens 72. Top surfaces 72A and 80A may both be aspherical surfaces.

Figure 15:
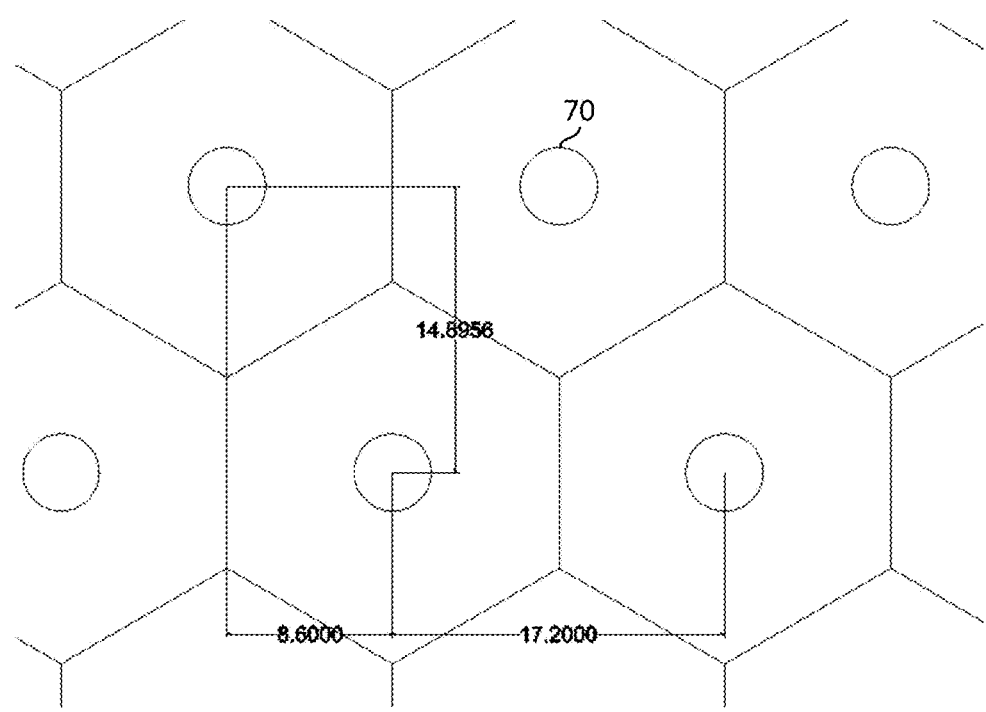
FIG. 15 depicts a top view of a light source with hexagonal cells, in accordance with one embodiment of the invention.

Still further embodiments of the invention may utilize a light source with hexagonal cells. The use of hexagonal cells provides a shorter average distance between the cell center and its edges as compared to square cells (keeping the ratio of the number of LEDs to total cell area constant), and consequently provides a reduction of non-uniformities in the irradiance present at the cell edges and especially at the cell corners. FIG. 15 illustrates an arrangement of the hexagonal cells in a honeycomb pattern, with LED 70 present at the center of each of the cells. Described in another way, LEDs

70 are located at the vertices of an equilateral triangle. The measurements shown in the illustration are for example only.

Figure 16A:
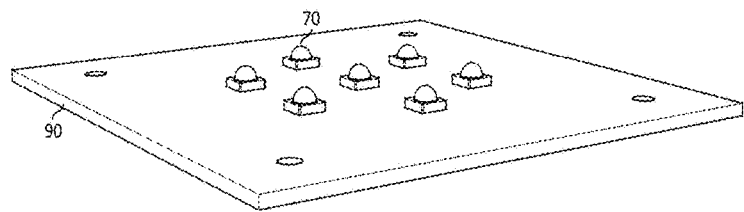
FIGS. 16A-C depict perspective, top and side views of LEDs mounted on a base plate of the light source of FIG. 15, respectively, in accordance with one embodiment of the invention.
Figure 16B:
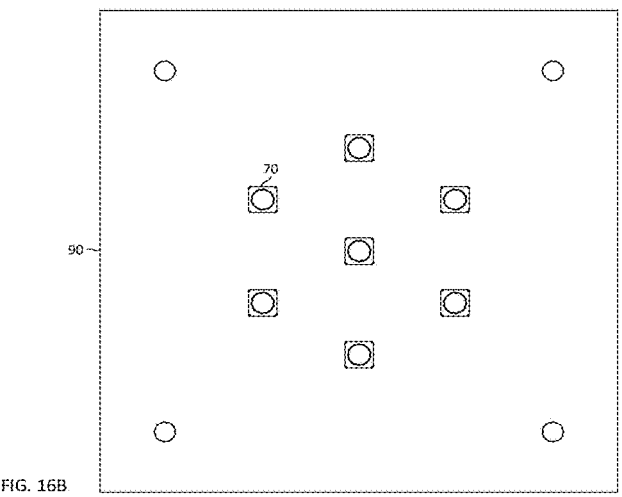
Figure 16C:
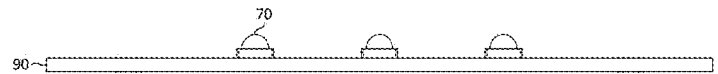

FIG. 16A depicts a perspective view of LEDs 70 mounted on base plate 90, which partially forms the light source with hexagonal cells. While seven LEDs are depicted for simplicity, it should be understood that a larger number of LEDs may be arranged in a similar manner (i.e., at corners of an equilateral triangle). FIGS. 16B and 16C depict top and side views of LEDs 70 mounted on base plate 90, respectively.

Figure 17A:
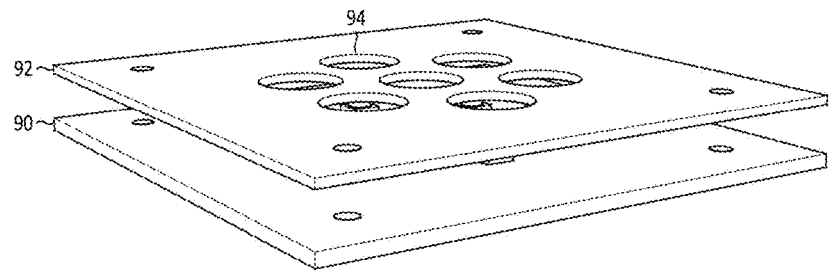
FIGS. 17A-C depict perspective, top and side views of a baffle plate (i.e., a plate with baffles) disposed over the base plate, respectively, in accordance with one embodiment of the invention.
Figure 17B:
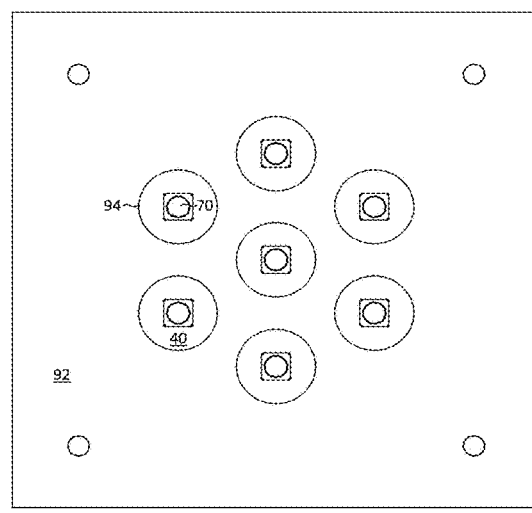
Figure 17C:
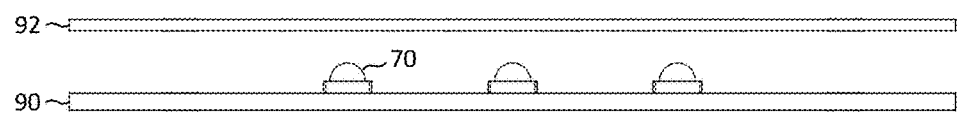

FIG. 17A depicts a perspective view of baffle plate 92 (i.e., a plate with cutouts that form baffles 94) disposed over base plate 90. Each of the baffles 94 is configured to constrain a beam of electromagnetic radiation propagating from a corresponding LED 70. In one embodiment, baffle plate 92 may be separated from base plate 90 by 4 mm. In one embodiment, each of the baffles 94 are circular in shape. FIG. 17B depicts a top view of baffle plate 92 disposed over base plate 90. As depicted in FIG. 17B, each of the baffles 94 are aligned with a corresponding LED 70 mounted on base plate 90. FIG. 17C depicts a side view of baffle plate 92 disposed over base plate 90.

Figure 18A:
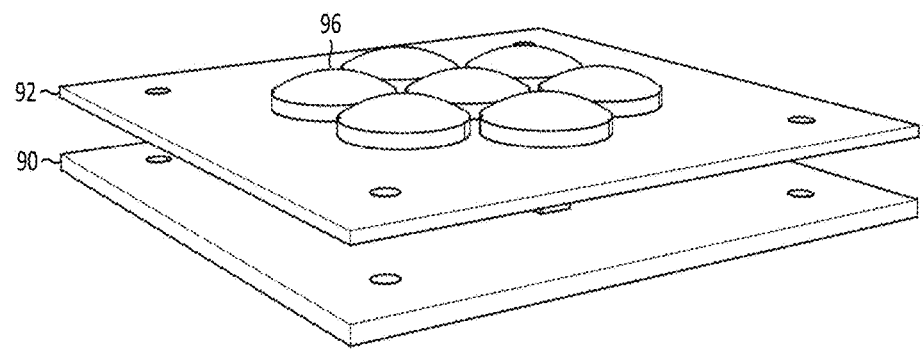
FIGS. 18A-C depict perspective, top and side views of circular lenses inserted into the baffle plate, respectively, in accordance with one embodiment of the invention.
Figure 18B:
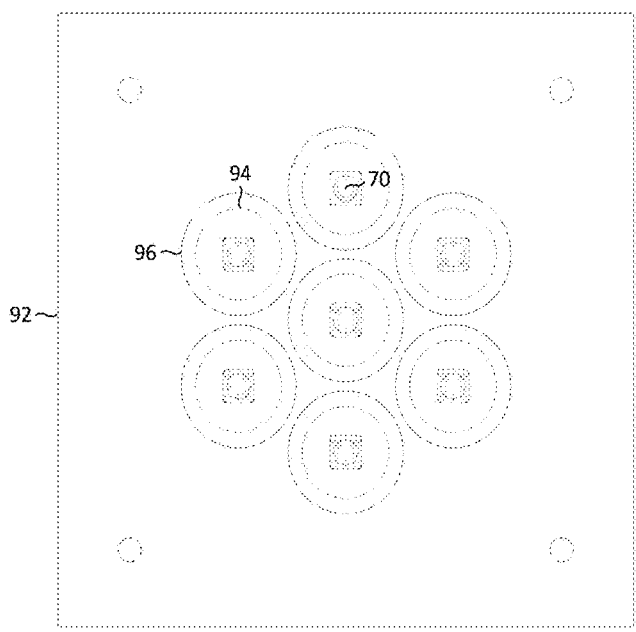
Figure 18C:
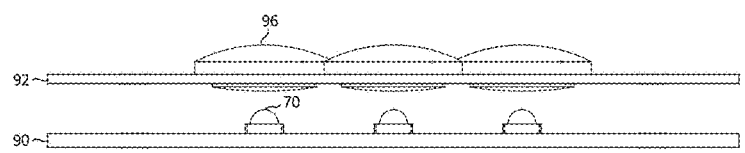

FIG. 18A depicts a perspective view of circular lenses 96 inserted into respective baffles 94 of baffle plate 92. Each of the circular lenses 96 is configured to receive a first beam of radiation from a corresponding baffle 94 and project a second beam of radiation which is more focused than the first beam of radiation. FIG. 18B depicts a top view of circular lenses 96 inserted into baffles 94 of baffle plate 92. A circumference of a circular lens may exceed a circumference of a baffle, so that a rim of circular lens may rest upon the top surface of baffle plate 92. FIG. 18C depicts a side view of circular lenses 96 inserted into baffles 94 of baffle plate 92. As shown in FIG. 18C, a bottom portion of circular lens 96 may protrude from baffle 94. In one embodiment, circular lens 96 may be a plano-convex lens which is made from plastic. In another embodiment, circular lens 96 may be a bi-convex lens.

Figure 19A:
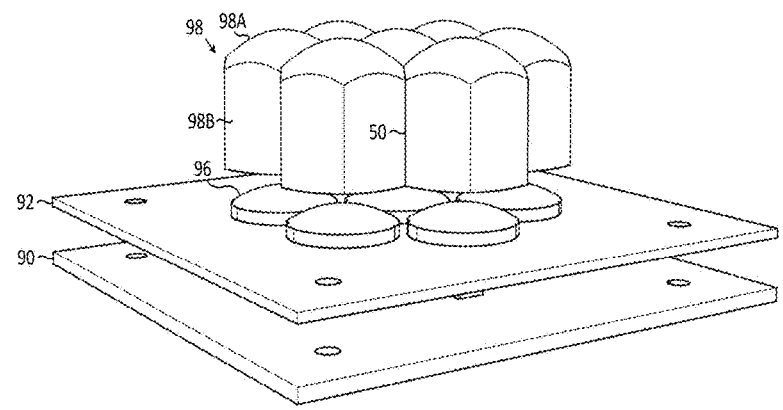
FIGS. 19A-C depict perspective, top and side views of hexagonal lenses disposed over the circular lenses, respectively, in accordance with one embodiment of the invention.

FIG. 19A depicts a perspective view of hexagonal lenses 98 disposed over the circular lenses 96. Each of the hexagonal lenses 98 is configured to receive the second beam of radiation from a corresponding circular lens 96 and project a third beam (which is substantially collimated) towards the focal plane 120. Each of the hexagonal lenses 98 may have a convex top surface 98A and six planar sidewalls 98B. In particular, top surface 98A may be an aspherical surface. In various embodiments, element 50 may be a thin sheet of material forming a partition (i.e., a diaphragm) between the hexagonal cells. In other instances, element 50 may be a covering or coating (e.g., a cladding) which surrounds each of lenses 98. In one particular example, element 50 may be an optically opaque (at the wavelength(s) of irradiation which cure the photo-curing liquid polymer) adhesive that binds lenses 98 together with one another.

Figure 19B:
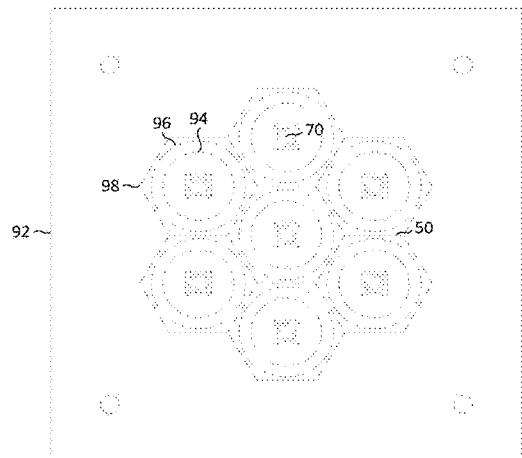
Figure 19C:
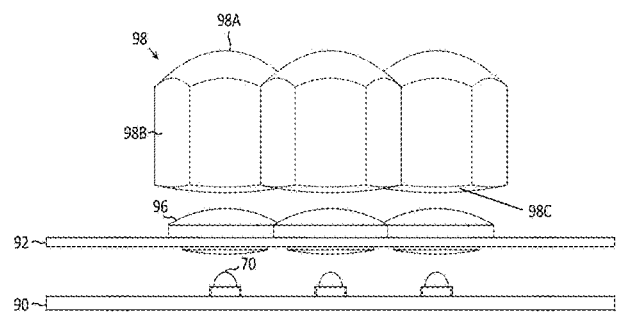

For the sake of comparison, it is noted that opaque adhesive 50 performs the role of partition 74 of the square-shaped cell embodiment. As the thickness of opaque adhesive 50 (e.g., 5 microns) is substantially less than the thickness of partition walls 74 (e.g., 1 mm), the shadow effect due to opaque adhesive 50 is substantially reduced, as compared to the shadow effect of partition 74. As a consequence, virtually no compensation for the shadow effect of opaque adhesive 50 is required in the hexagonal cell light source, resulting in less non-uniformity at the cell edges. FIGS. 19B and 19C depict top and side views of hexagonal lenses 98 disposed over circular lenses 46, respectively. The bottom surface 98C of hexagonal lens 98 is partially visible in FIG. 19C. A structure (not depicted) is used to support the periphery of the ensemble of hexagonal lenses 98 which are adhered together.

Figure 20:
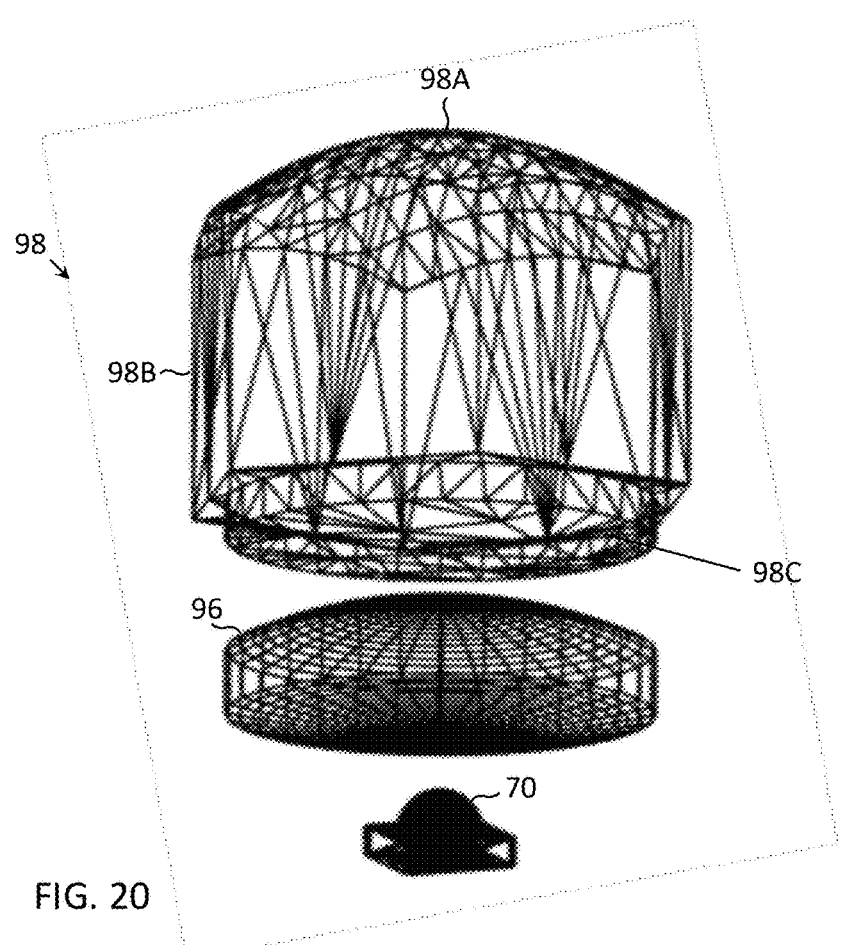
FIG. 20 depicts a perspective view of certain components associated with one hexagonal cell of the light source of FIG. 14, in accordance with one embodiment of the invention.

FIG. 20 depicts a perspective view of certain components associated with one hexagonal cell of a light engine, in accordance with one embodiment of the invention. Included in FIG. 20 are hexagonal lens 98 with top surface 98A, six side surfaces 98B and bottom surface 98C. Circular lens 96 is disposed between hexagonal lens 98 and LED 70. Baffles are not depicted in FIG. 20. A multitude of such cells may be present in a complete light engine. Further, although in the description above, one LED was present for each cell, in another embodiment, multiple LEDs (e.g., one or more UV, one red, one green, and/or one blue LED) may be present in each cell.

In addition to the above-described embodiments, further embodiments of the invention may employ telecentric lenses in lieu of square-shaped or other lenses in a lens array. Telecentric lenses are compound lenses, and embodiments of the invention may employ bi-telecentric lenses, which are characterized as having both entrance and exit pupils at infinity. The use of bi-telecentric lenses may allow for reduced image distortions (e.g., pincushion and/or barrel distortions) and other errors in illumination from the collimated light source.

Alternatively, Fresnel lenses may be employed in the lens arrays in lieu of the square-shaped or other lenses discussed above. For example, Vu et al., "LED Uniform Illumination Using Double Linear Fresnel Lenses for Energy Saving," Energies 2017, 10, 2091 (Dec. 11, 2017) describe the use of such a collimator for an array of LEDs. In embodiments of the present invention, a linear Fresnel lens array offers the advantage of being relatively thin for the desired focal length. In order to capture as much light as possible from the LED sources, additional prismatic elements may be used to direct the light emitted by the LEDs to the individual lens elements. Alternatively, or in addition, the individual LEDs may be surrounded by reflectors to redirect additional light that would otherwise be absorbed by the baffles to the lenses of the array.

In the above-described embodiments, linear arrangements of the LEDs and the collimating optics were described, however, other arrangements are possible. For example, side illumination arrangements, in which the LEDs are arranged to emit light orthogonally (or approximately so) to the plane in which the light is ultimately projected into the tank may be used. Such "side illumination" or "edge lit" arrangements may employ collimating films, such as so-called Brightness Enhancement Films from 3M Company of St. Paul, Minn., to direct the light to the LCD unit. These films employ a prismatic structure to change the direction of incident light.

Further, while the use of LEDs as a light source has been discussed in connection with the above-described embodiments, other light sources may be employed. For example, mercury arc lamps have traditionally been used as sources of UV radiation in photolithography applications, and can likewise be employed in light engines as described herein.

Thus, light engines for use in 3D printing apparatus that rely on photo-curing of liquid polymers for the formation of three-dimensional objects have been described.

What is claimed is:

1. An apparatus for forming three-dimensional objects by photo-curing a photo-curing liquid polymer by exposure to a radiation, comprising a tank for containing the liquid polymer, and a collimated light source to emit said radiation by which said photo-curing liquid polymer undergoes curing through a radiation-transparent opening in said tank, wherein said collimated light source comprises:
- a plurality of light emitting diode (LED) groups, and, corresponding to each of the LED groups,
  - (i) a baffle configured to constrain and direct a first beam of electromagnetic radiation propagating from the LED group; and
  - (ii) a lens arrangement configured to receive the first beam of electromagnetic radiation, and project a second beam of electromagnetic radiation, said second beam of electromagnetic radiation being characterized by substantially parallel light rays,
- wherein the lens arrangement comprises a first lens configured to receive the first beam of electromagnetic radiation, and project an intermediate beam of electromagnetic radiation; and a second lens configured to receive the intermediate beam from the first lens, and project the second beam of electromagnetic radiation towards the photo-curing liquid polymer.

2. The apparatus for forming three-dimensional objects according to claim 1, wherein each of the plurality of LED groups comprises more than one LED.

3. The apparatus for forming three-dimensional objects according to claim 1, wherein the second lens has six side surfaces.

4. The apparatus of claim 1, wherein the baffle corresponding to each of the LED groups has a circular cross-section.

5. The apparatus of claim 1, wherein the second lenses of each of the LED groups are arranged in a honeycomb pattern with respect to one another.

6. The apparatus of claim 1, wherein a cladding surrounds side surfaces of the second lenses corresponding to each of the LED groups and the cladding substantially absorbs electromagnetic radiation.

7. The apparatus of claim 6, wherein the second lenses corresponding to each of the LED groups are affixed to one another by an opaque glue, and wherein the opaque glue forms the cladding.

8. The apparatus of claim 1, wherein for each of the LED groups, a portion of the first lens is disposed within the baffle.

9. The apparatus of claim 1, wherein each of the LED groups are arranged at respective centers of hexagonal-shaped cells of a honeycomb lattice.

10. The apparatus of claim 1, wherein for each of the LED groups, the first lens is a plano-convex lens.

11. The apparatus of claim 1, wherein for each of the LED groups, the first lens is circular shaped.

12. The apparatus of claim 1, wherein for each of the LED groups, the second lens is a plano-convex lens.

13. The apparatus of claim 1, further comprising:
- a first supporting plate configured to support the plurality of LEDs; and
- a second supporting plate separated by a distance from the first supporting plate and configured to support the first lenses.

14. The apparatus of claim 13, wherein the baffles are formed as cutouts in the second supporting plate.

* * * * *